United States Patent
Toyokawa et al.

(10) Patent No.: US 6,883,538 B2
(45) Date of Patent: Apr. 26, 2005

(54) FLOW CONTROL VALVE COUPLING STRUCTURE

(75) Inventors: Masayuki Toyokawa, Wako (JP); Hiromu Nakamura, Wako (JP); Ryohei Adachi, Wako (JP); Iwao Murakami, Ogaki (JP); Chikashi Ono, Ogaki (JP)

(73) Assignees: Pacific Engineering Corp., Gifu-ken (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/991,280

(22) Filed: Nov. 15, 2001

(65) Prior Publication Data

US 2002/0062869 A1 May 30, 2002

(30) Foreign Application Priority Data

Nov. 17, 2000 (JP) .................................... 2000-351178

(51) Int. Cl.[7] .......................... F16K 15/06; F02M 25/06
(52) U.S. Cl. .............................. 137/454.5; 135/515.3; 251/152; 123/574; 285/140.1; 285/208; 285/259
(58) Field of Search ...................... 137/454.5, 515.3; 123/574; 285/140.1, 208, 212, 215, 216, 217, 218, 258, 259, 260, 209; 251/152

(56) References Cited

U.S. PATENT DOCUMENTS

| | | | | |
|---|---|---|---|---|
| 2,132,636 A | | 10/1938 | Maahs .......................... 285/52 |
| 3,212,796 A | * | 10/1965 | Neuschotz .................. 285/212 |
| 3,359,960 A | * | 12/1967 | Pittsley ....................... 123/574 |
| 3,568,977 A | * | 3/1971 | Nelson ......................... 251/148 |
| 3,594,020 A | * | 7/1971 | Ehlert .......................... 285/239 |
| 3,642,252 A | * | 2/1972 | Phillips ........................ 251/145 |
| 3,659,573 A | * | 5/1972 | Bennett ........................ 123/574 |
| 3,661,128 A | * | 5/1972 | Eshelman .................... 123/574 |
| 3,677,578 A | | 7/1972 | Roos ............................ 285/162 |
| 3,709,204 A | * | 1/1973 | Noponen ...................... 123/574 |
| 3,863,960 A | * | 2/1975 | Andersson ................... 285/39 |
| 3,879,069 A | | 4/1975 | Oostenbrink ................ 285/162 |
| 3,949,719 A | * | 4/1976 | Bellanca et al. ............ 123/574 |
| 4,232,421 A | * | 11/1980 | Tucker ......................... 16/2.2 |
| 4,625,703 A | * | 12/1986 | Otto et al. ................... 123/574 |
| 4,886,019 A | * | 12/1989 | Davis et al. ............. 123/41.86 |
| 4,905,657 A | * | 3/1990 | Betterton et al. ........... 123/574 |
| 5,029,879 A | * | 7/1991 | Strang et al. ............. 285/140.1 |
| 5,348,048 A | * | 9/1994 | Schirado et al. ............ 251/152 |

FOREIGN PATENT DOCUMENTS

| | | |
|---|---|---|
| EP | 0562957 A1 | 9/1993 |
| GB | 127975 | 4/1971 |
| JP | 2000-161040 | 6/2000 |

* cited by examiner

*Primary Examiner*—John Rivell
(74) *Attorney, Agent, or Firm*—Sheridan Ross PC

(57) ABSTRACT

A flow control valve coupling structure that does not require complicated machining and facilitates the installation of a flow control valve. The coupling structure includes a fitting portion having a male thread that is formed on a peripheral surface of the flow control valve. A coupled member has a coupling hole to receive the flow control valve. A cylindrical elastic sealing member is engaged with the coupling hole to seal the space between the flow control valve and the coupling hole. The elastic sealing member has an inner surface defining a mounting hole in which the fitting portion is fitted. A female thread is formed on the inner surface and is mated with the male thread of the fitting portion.

8 Claims, 6 Drawing Sheets

FLOW CONTROL VALVE COUPLING STRUCTURE

BACKGROUND OF THE INVENTION

The present invention is related to a coupling structure of a flow control valve, and more particularly, to a coupling structure of a flow control valve for a blowby gas returning apparatus that is provided in an internal combustion engine.

Figure 1:
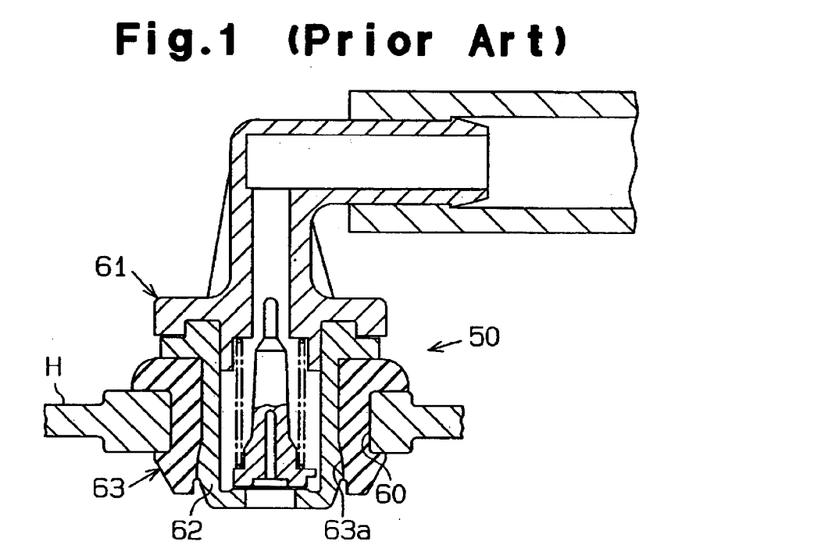
FIG. 1 is a schematic cross-sectional view showing a first example of a prior art PCV valve coupling structure.

FIG. 1 is a cross-sectional view showing a first example of a conventional flow control valve coupling structure 50 for a blowby gas returning apparatus (hereinafter a PCV valve). In the coupling structure 50, a fitting portion 62 of the PCV valve 61 is fitted axially to a coupling hole 60 that is provided in a cylinder head cover H. The PCV valve 61 is detachably coupled to the cylinder head cover H.

In the coupling structure 50, a cylindrical grommet 63 is first fitted to the coupling hole 60. Next, the fitting portion 62 of the PCV valve 61 is fitted to a mounting hole 63*a* of the grommet 63 thereby coupling the PCV valve 61 to the cylinder head cover H. The cylinder head cover H is required to undergo only machining to form the round coupling hole 60.

However, the fitting allowance of the fitting portion 62 requires high accuracy so that the fitting portion 62 of the PCV valve 61 does not fall out of the grommet 63. This increases the number of steps necessary for fitting the PCV valve 61 in the grommet 63.

Figure 2:
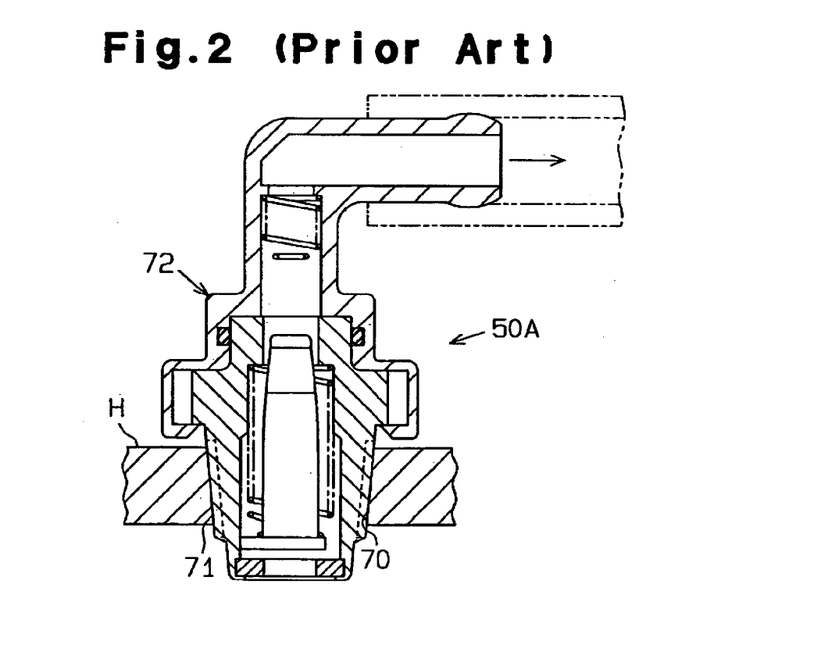
FIG. 2 is a schematic cross-sectional view showing a second example of a prior art coupling structure of a PCV valve.

FIG. 2 is a cross-sectional view showing a second example of a conventional PCV valve coupling structure 50A. The coupling structure 50A is disclosed in Japanese Unexamined Patent Publication No. 2000-161040. In the coupling structure 50A, a female thread is formed in a coupling hole 70 of the cylinder head cover H and a male thread is formed on a fitting portion 71 of the PCV valve 72. The PCV valve 72 is coupled to the cylinder head cover H by screwing the fitting portion 71 into the coupling hole 70. In the coupling structure 50A, it is not necessary to fit a grommet to the coupling hole 70. However, since the coupling structure 50A does not use a grommet, vibration of the internal combustion engine is transmitted directly to the PCV valve 72. Further, the machining of the female thread in the coupling hole 70 increases the number of steps required to couple the PCV valve 72 to the cylinder head cover H.

BRIEF SUMMARY OF THE INVENTION

It is an object of the present invention to provide a flow control valve coupling structure that does not require complicated machining and simplifies coupling to a cylinder head cover.

To achieve the above object, the present invention provides a coupling structure for a flow control valve. The coupling structure includes a fitting portion having a male thread that is formed on a peripheral surface of the flow control valve. A coupled member has a coupling hole to receive the flow control valve. A cylindrical elastic sealing member is engaged with the coupling hole to seal the space between the flow control valve and the coupling hole. The elastic sealing member has an inner surface defining a mounting hole in which the fitting portion is fitted. A female thread is formed on the inner surface. The female thread is mated with the male thread of the fitting portion.

A further aspect of the present invention is a flow control valve received in a predetermined coupling hole. The valve includes a fitting portion engaged with the coupling hole and having a peripheral surface. A male thread is formed on the peripheral surface. A main body is connected to the fitting portion and formed from synthetic resin.

A further aspect of the present invention is a cylindrical elastic sealing member formed from a rubber material. The elastic sealing member receives a fitting body. The elastic sealing member includes a mounting hole for receiving the fitting body. A pressed portion is formed on a inner surface defining the mounting hole and pressed by the fitting body. The pressed portion radially expands the elastic sealing member when pressed by the fitting body.

Other aspects and advantages of the invention will become apparent from the following description, taken in conjunction with the accompanying drawings, illustrating by way of example the principles of the invention.

BREIF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 3:
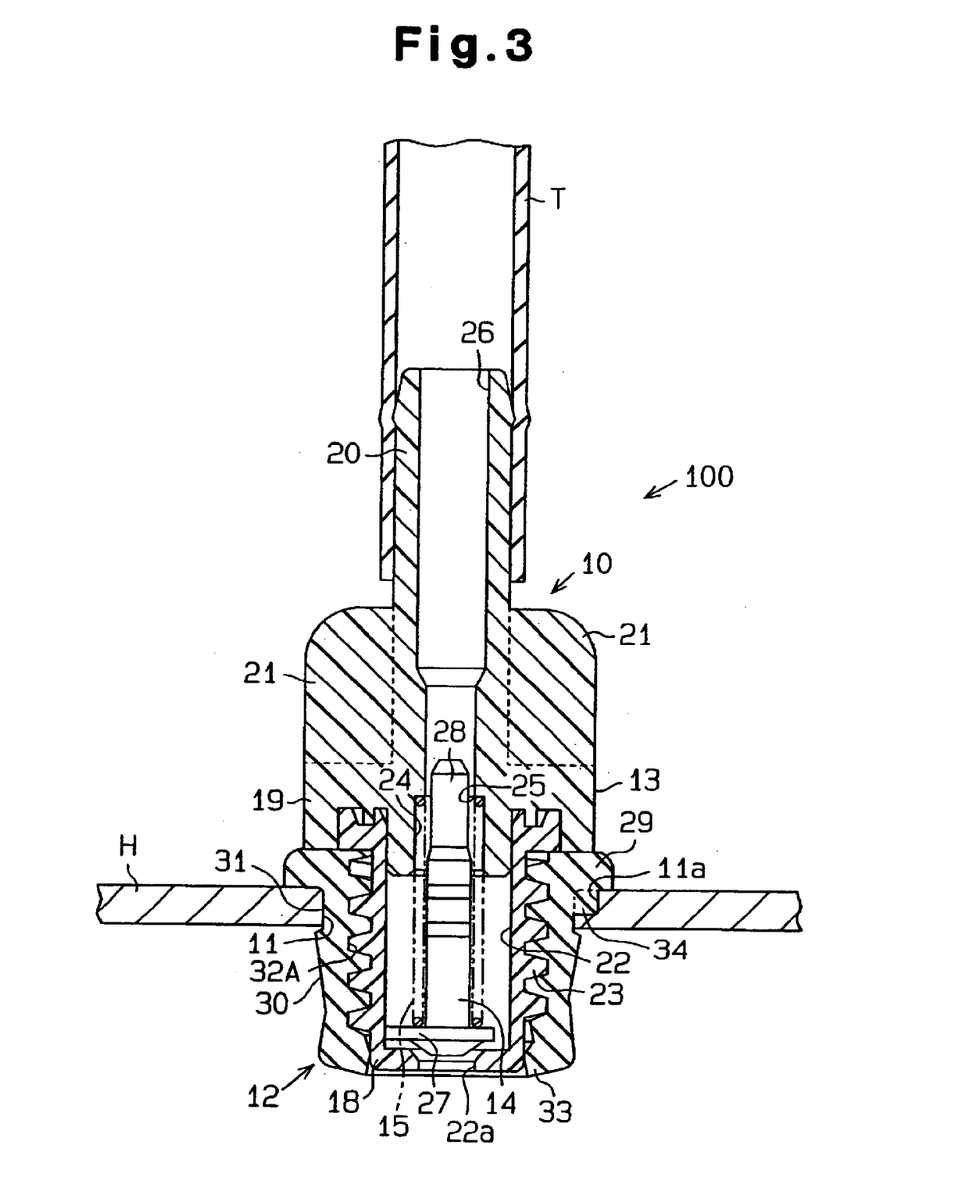
FIG. 3 is a schematic cross-sectional view of a PCV valve coupling structure according to a first embodiment of the present invention.

FIG. 3 is a schematic cross-sectional view showing a PCV valve coupling structure 100 according to a first embodiment of the present invention. The PCV valve coupling structure 100 includes a PCV valve 10 and a grommet (an elastic sealing member) 12.

Figure 4:
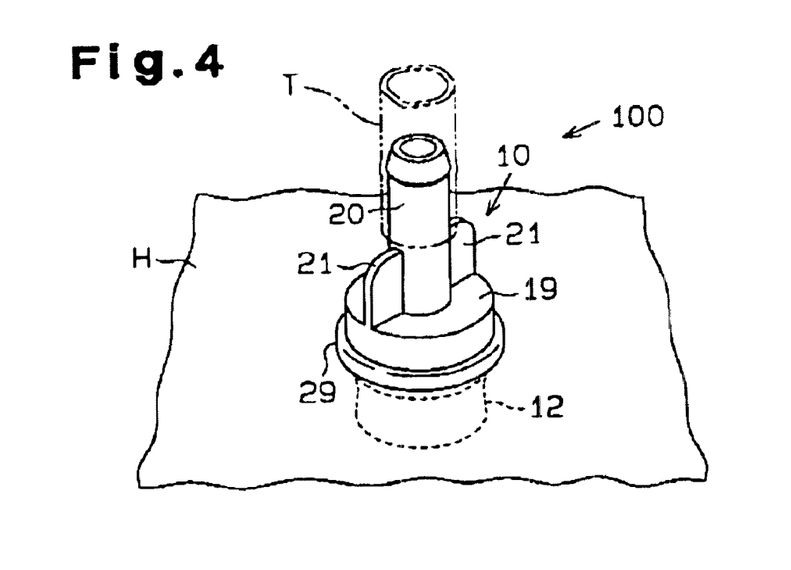
FIG. 4 is a schematic perspective view showing the PCV valve coupling structure of FIG. 3 in which a grommet is engaged with a coupling hole.
Figure 5:
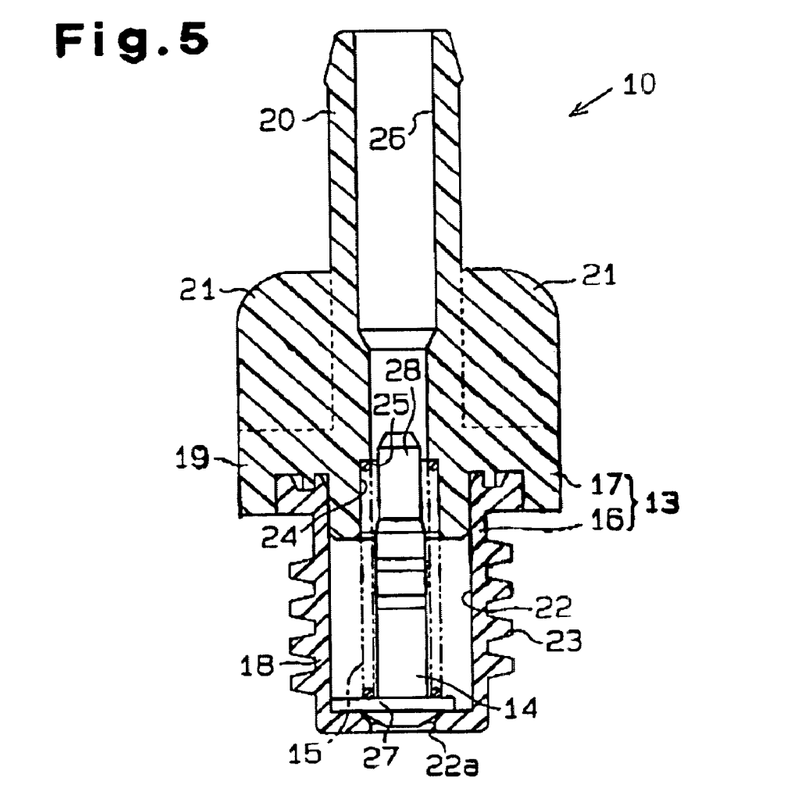
FIG. 5 is a cross-sectional view showing the PCV valve coupling structure of FIG. 3.

As shown in FIG. 4, the PCV valve 10 is detachably engaged with a coupling hole 11 (shown in FIG. 3), which is formed in an engine cylinder head cover H, by means of the grommet 12. The head cover H serves as a coupled member to which the PCV valve 10 is coupled. A tubing hose T, which is connected to an intake system of an intake manifold (not shown), is connected to the PCV valve 10. As shown in FIG. 5, the PCV valve 10 includes a main body 13, a valve body 14, and a coil spring 15.

The main body 13 includes a lower piece 16 and an upper piece 17, each of which is formed integrally from synthetic resin. The lower piece 16 includes a generally cylindrical fitting portion 18. A generally cylindrical valve chamber 22 is formed in the fitting portion 18. The valve chamber 22 is communicated with the atmosphere via a valve hole 22a, which extends through the bottom of the fitting portion 18. A male thread 23 is formed on the peripheral surface of the fitting portion 18.

The upper piece 17 includes a generally cylindrical base 19, a hose connector 20, and tabs 21. The base 19 has a diameter larger than that of the fitting portion 18. The hose connector 20 is generally cylindrical and extends upward from the base 19.

The tabs 21, which define a rotating portion, are thin plates extending from opposite sides of the hose connector 20. When the PCV valve 10 is attached to or detached from the head cover, the tabs 21 are used to rotate the PCV valve 10. When the tubing hose T is connected to the hose connector 20, the tabs 21 are used to position the tubing hose T.

A lower communication hole 24 that communicates with the upper portion of the valve chamber 22 extends through the base 19. A step 25 facing the valve chamber 22 is formed in the lower communication hole 24.

An upper communication hole 26, which is communicated with the lower communication hole 24, extends through the hose connector 20. The tubing hose T is connected to the hose connector 20. The upper communication hole 26 is communicated with the intake system of the engine by the tubing hose T.

The cylindrical valve body 14 is arranged in the valve chamber 22 and formed integrally from synthetic resin. The valve body 14 moves axially and has a predetermined stroke. The valve body 14 has a lower end, from which a valve flange 27 extends, and an upper end, on which a valve portion 28 is defined.

The valve flange 27 slidably contacts the wall surface of the valve chamber 22 at three points to radially support the lower portion of the valve body 14. The valve flange 27 divides the valve chamber 22 into an upper portion and a lower portion, and the upper portion and the lower portion are communicated with each other through the valve flange 27. When the valve body 14 is positioned at the lowest end of its stroke, the valve flange 27 closes the valve hole 22a. In this state, the cross-sectional area of a flow passage defined between the step 25 and the valve portion 28 is maximum. The cross-sectional area of the flow passage becomes smaller as the valve body 14 moves upward.

The coil spring 15 is fitted on the valve body 14 and arranged between the step 25 and the valve flange 27. The coil spring 15 urges the valve body 14 downward and causes the valve flange 27 to close the valve hole 22a when an upward force is not applied to the valve body 14.

The negative pressure in the intake system of the engine is communicated to the valve chamber 22 via the lower and upper communication holes 24, 26 by the tubing hose T. The valve body 14 moves upward against the urging force of the coil spring 15 in accordance with the negative pressure and opens the valve hole 22a. In the PCV valve 10, as the negative pressure increases, the cross-sectional area of the flow passage decreases. This decreases the amount of blowby gas that flow through the valve hole 22a toward the intake system.

Figure 6A:
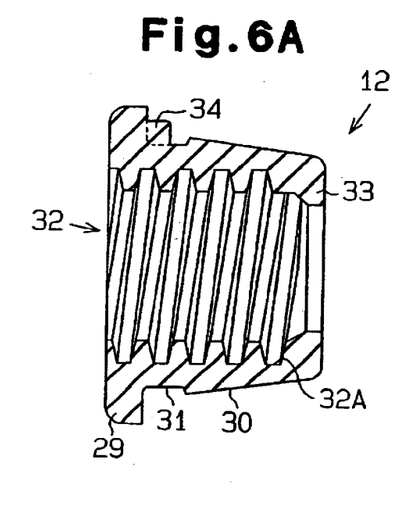
FIG. 6A is a cross-sectional view showing the grommet of employed in the coupling structure of FIG. 3.
Figure 6B:
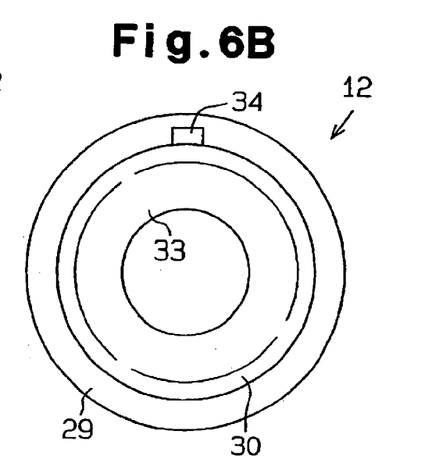
FIG. 6B is a top view showing the grommet of FIG. 3.

Referring to FIGS. 6A and 6B, the grommet 12 is cylindrical and formed integrally from synthetic rubber. A grommet flange 29 extends from the basal end (the left end as viewed in FIG. 6A) of the grommet 12. The outer diameter of the grommet 12 decreases from the basal end, in which the flange is formed, to the distal end. That is, a tapered surface 30 is defined on part of the peripheral surface of the grommet 12. A groove 31 extends between the tapered surface 30 and the grommet flange 29. The maximum outer diameter of the tapered surface 30 is slightly greater than the inner diameter of the coupling hole 11. When the grommet 12 is fitted in the coupling hole 11, it deforms slightly and the diameter of the tapered surface 30 is slightly decreased. The groove 31 has an outer diameter that does not change when the grommet 12 is fitted in the coupling hole 11.

The grommet 12 has a fitting hole (a female screw hole) 32, in which the fitting portion 18 of the PCV valve 10 is fitted. A female thread 32A, which is meshed with a male thread 23 of the fitting portion 18, is formed on the surface of the female screw hole 32. A pressed portion 33 projects inward into an opening formed at the distal end of the grommet 12. The inner diameter of the pressed portion 33 is smaller than the root diameter of the male thread 23.

A stopper 34 is formed in the groove 31. The stopper 34 prevents the grommet 12 from rotating in the coupling hole 11 when the male thread 23 is meshed with the female thread 32A.

Referring to FIG. 3, the diameter of the coupling hole 11 is such that the groove 31 of the grommet 12 can be fitted in the coupling bole 11. A stopper socket (rotation restricting structure) 11a is provided in the surface of the cylinder head H adjacent to the coupling hole 11. The stopper (rotation restricting structure) 34 is received in the coupling hole 11 to restrict the rotation of the grommet 12 in the coupling hole 11.

In the first embodiment, the PCV valve 10 is attached to the head cover H by fitting the grommet 12, to which the fitting portion 18 is attached, into the coupling hole 11.

Figure 8:
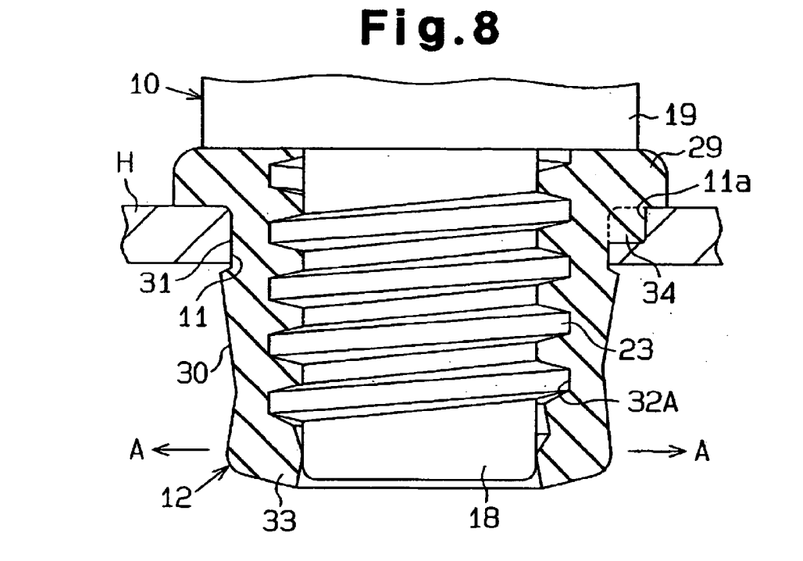
FIG. 8 is a cross-sectional view showing the grommet engaged with the coupling hole.

Referring to FIG. 8, the distal end of the fitting portion 18 forces the pressed portion 33 outward (the direction indicated by arrow A). This radially expands the lower portion of the grommet 12, When the male thread 23 is meshed with the female thread 32A, the distal end of the fitting portion 18 presses the pressed portion 33 and expands the grommet 12.

The grommet 12 is coupled to the coupling hole 11 in a state in which its lower portion is radially expanded. The grommet 12 is fixed at a proper position by fitting the groove 31 in the coupling hole 11. When the grommet 12 is pulled together with the PCV valve 10 from the coupling hole 11, the expanded lower portion of the grommet 12 prevents the grommet 12 from being removed from the coupling hole 11. Therefore, the grommet 12 is not pulled out of the coupling hole 11 with the PCV valve 10.

Next, the steps for coupling the PCV valve to the coupling hole 11 will be explained.

Figure 7A:
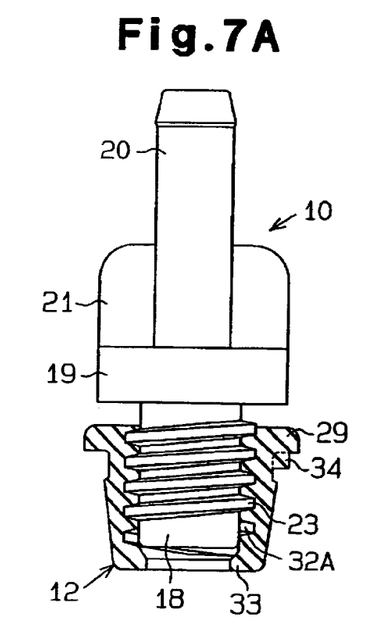
FIG. 7A is a front view showing the grommet attached to the PCV valve.

First, as shown in FIG. 7A, the male thread 23 of the PCV valve 10 is halfway mated with the female thread 32A of the grommet 12 to engage the grommet 12 with the fitting portion 18. In this state, the fitting portion 18 is screwed into the female thread 32A until the distal end of the fitting portion 18 reaches a position just before the distal end applies force to the pressed portion 33 of the grommet 12 so that the lower portion (the lower portion as viewed in FIG. 7A) of the grommet 12 is not radially expanded.

Figure 7B:
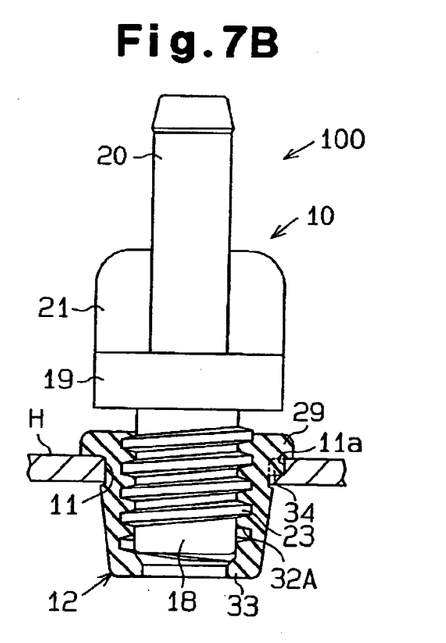
FIG. 7B is a front view showing the PCV valve fitted in the coupling hole.

Next, referring to FIG. 7B, the grommet 12, which is engaged with the fitting portion 18, is fitted in the coupling hole 11. In this state, an end surface (the lower end surface in FIG. 7A) of the grommet flange 29 contacts the surface of the head cover H and the groove 31 is fitted in the coupling hole 11. The stopper 34 is engaged with the stopper socket 11a.

Finally, the tabs 21 are rotated to further screw the male thread 23 into the female thread 32A, as shown in the state of FIG. 3. In this state, the pressed portion 33 is forced outward by the distal end of the fitting portion 18. This radially expands the lower portion of the grommet 12. The expanded grommet 12 is fixed to the coupling hole 11, and the PCV valve 10 is coupled in the coupling hole 11 by means of the grommet 12.

Alternatively, when the PCV valve 10 is coupled to the grommet 12 after the grommet 12 is engaged with the coupling hole 11, the male thread 23 of the fitting portion 18 is mated with the female thread 32A of the grommet 12. When the male thread 23 is fully mated with the female thread 32A, the distal end of the fitting portion 18 applies force to the pressed portion 33 and expands the pressed portion 33 outward.

When removing the PCV valve 10 from the coupling hole 11, the tabs 21 are rotated to disengage the male thread 23 from the female screw hole 32 so that the fitting portion 18 does not apply force to the pressed portion 33. This returns the grommet 12 to the state shown in FIG. 7B in which the lower portion of the grommet 12 is not expanded.

Next, the PCV valve 10 is removed from the coupling hole 11 with the male thread 23 still halfway mated with the female thread 32A. The PCV valve 10 is removed from the coupling hole 11 with the grommet 12, as shown in the state of FIG. 7A. Alternatively, the male thread 23 may be completely disengaged from the female screw hole 32. In this state, the PCV valve 10 is removed from the coupling hole 11 with the grommet 12 engaged with the coupling hole 11.

The following advantages are obtained in the PCV valve coupling structure 100 of the first embodiment.

(1) The male thread 23, which is formed on the fitting portion 18 of the PCV valve 10, is meshed with the female thread 32A of the grommet 12. Thus, the PCV valve 10 is engaged with the grommet 12 without requiring a highly accurate fitting allowance. The formation of the female screw hole 32 in the grommet 12 decreases the number of machining steps in comparison to when forming a female screw in the coupling hole 11. Additionally, the vibration of the internal combustion engine is absorbed by the grommet 12 and the vibration is not transferred directly to the PCV valve 10. Further, a step for engaging the PCV valve 10 to the grommet 12 is not necessary.

(2) The fitting portion 18 engaged with the female screw hole 32 expands the distal end of the grommet 12. Therefore, the grommet 12 and the PCV valve 10 are securely engaged with the coupling hole 11.

(3) When the grommet 12 is fitted to the coupling hole 11, the stopper 34 is received in the stopper socket 11a. Therefore, when the male thread 23 is mated with the female thread 32A, the grommet 12 does not rotate in the coupling hole 11. As a result, the PCV valve 10 is easily attached to and detached from the coupling hole 11.

(4) The stopper socket 11a is formed adjacent to the coupling hole 11 without extending through the cylinder head H. Thus, the stopper socket 11a does not affect the seal of the coupling hole 11.

(5) When the PCV valve 10 is attached to or detached from the coupling hole 11, the tabs 21 are manually rotated to mate the male thread 23 of the PCV valve 10 and the female thread 32A of the grommet 12 with an appropriate fastening torque. Therefore, the PCV valve 10 is easily attached to or detached from the coupling hole 11 without using any tools such as a spanner. Further, the fastening torque is easily controlled.

(6) The tabs 21 increase the rigidity of the hose connector 20. Thus, the tabs 21 increase the durability and reliability of the hose connector 20, which may repeatedly be connected with a hose.

(7) The PCV valve 10 must be rotated about its axis when the PCV valve 10 is coupled to and removed from the coupling hole 11. Thus, the tubing hose T must be removed from the PCV valve 10. When the PCV valve 10 is removed from the coupling hole 11, the tubing hose T is also removed from the PCV valve. Therefore, if the engine is operated in such state, the engine speed would abnormally increase such that one would recognize that the PCV valve 10 is not in place.

Figure 9:
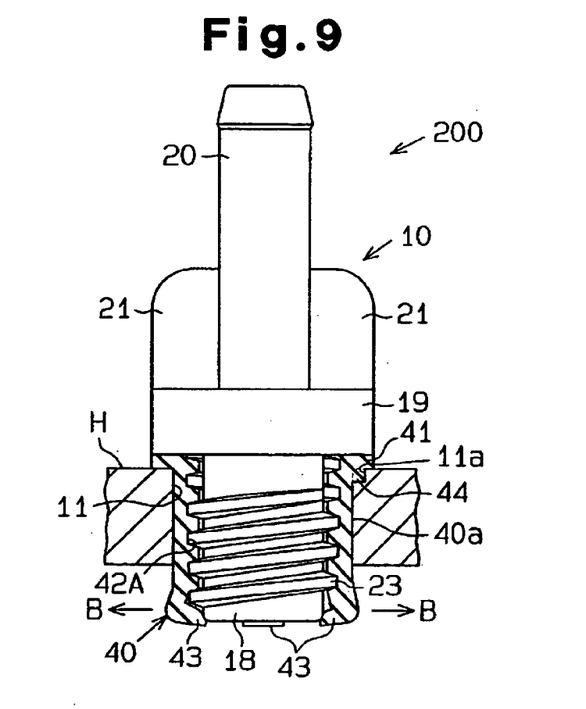
FIG. 9 is a schematic cross-sectional view showing a PCV valve coupling structure according to a second embodiment of the present invention.

FIG. 9 is a schematic cross-sectional view showing a PCV coupling structure 200 according to a second embodiment of the present invention. The PCV valve coupling structure 200 includes a PCV valve 10 and a grommet 40. The PCV coupling structure 200 of the second embodiment differs from the coupling structure 100 of the first embodiment only in the grommet.

Figure 10A:
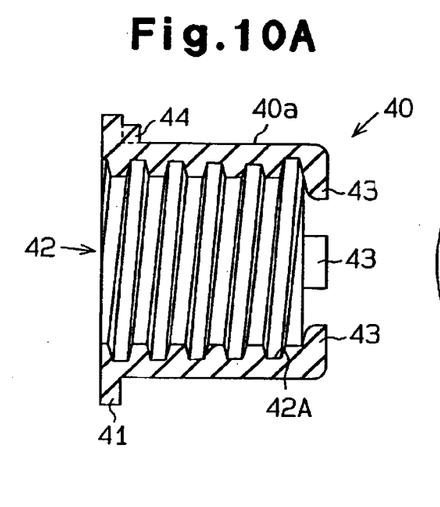
FIG. 10A is a cross-sectional view showing a grommet that is employed in the coupling structure of FIG. 9.
Figure 10B:
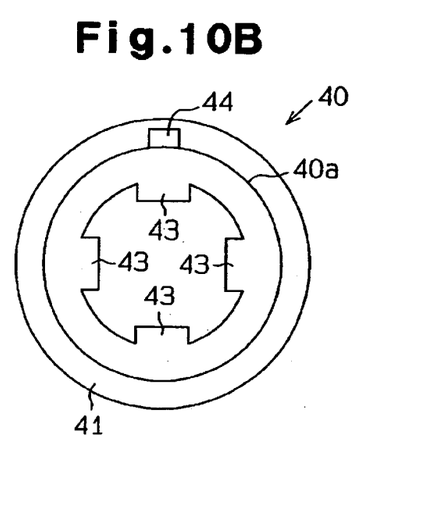
FIG. 10B is a top view showing the grommet of FIG. 9.

Referring to FIGS. 10A and 10B, the grommet 40 of the second embodiment is cylindrical and formed integrally from synthetic rubber or synthetic resin. A grommet flange 41 extends from the basal end (the left end in FIG. 10A) of the grommet 40. The diameter of the peripheral surface 40a of the grommet 40 is substantially equal to the diameter of the coupling hole 11. Therefore, when the grommet 40 is fitted in the coupling hole 11, the diameter of the peripheral surface 40a remains substantially the same.

The grommet 40 has a mounting hole (a female screw hole) 42 in which the fitting portion 18 of the PCV valve 10 is received. A female thread 42A, which is meshed with the male thread 23 of the fitting portion 18, is formed on the inner surface of the female screw hole (mounting hole) 42.

Four equally spaced pressed portions 43 project radially from the inner surface at the distal end of the grommet 40. The diameter of a circle tangential to the distal ends of the four pressed portions 43 is smaller than the root diameter of the male thread 23.

Further, a stopper 44 is arranged on the peripheral surface 40a of the grommet 40 adjacent the grommet flange 41. When the male thread 23 is mated with the female thread 32A, the stopper 44 prevents the grommet 40 from rotating in the coupling hole 11.

Figure 11:
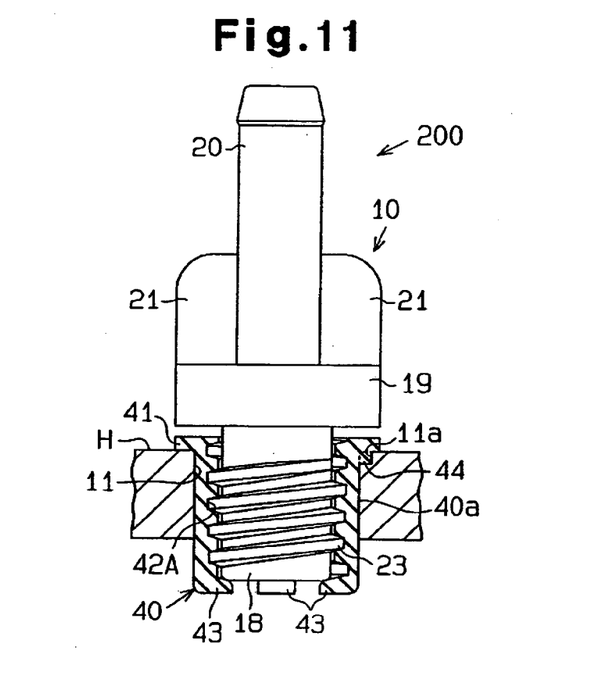
FIG. 11 is a front view showing the PCV valve fitted in the coupling hole.

As shown in FIG. 11, the PCV valve 10 is coupled to the head cover H by fitting the grommet 40, which is attached with the fitting portion 18, into the coupling hole 11.

Referring to FIG. 9, the distal end of the fitting portion 18 forces each of the pressed portions 43 outward (the direction indicated by arrow B) and expands the lower portion of the grommet 40 in the radial direction of the coupling hole 11. The enlarged grommet 40 is held in the coupling hole 11. The mating of the male thread 23 with the female thread 32A enlarges the distal end of the grommet 40 and fixes the PCV valve 10 in the axial direction.

Next, the procedure for coupling the PCV valve 10 to the coupling hole 11 will be explained.

First, the female thread 42A is halfway mated with the male thread 23 of the PCV valve 10. The fitting portion 18 is screwed into the female screw hole 32 until the distal end of the fitting portion 18 reaches a position just before the distal end applies force to the pressed portions 43 of the grommet 40 so that the grommet 12 is not radially expanded.

Next, as shown in FIG. 11, the grommet 40, which is attached with the fitting portion 18, is fitted in the coupling hole 11 so that an end surface of the grommet flange 41 contacts the surface of the head cover H. In this state, the stopper 44 is received in to the stopper socket 11a.

Finally, the PCV valve 10 is rotated to fully mate the male thread 23 and the female thread 42A, as shown in the state of FIG. 9. Thus, the distal end of the fitting portion 18 applies outward force to each pressed portion 43 and radially expands the lower portion of the grommet 40. The expanded grommet 40 is fixed in the coupling hole 11. This, in turn, fixes the PCV valve 10, which is attached to the grommet 40, to the coupling hole 11. Alternatively, the grommet 40 may first be engaged with the coupling hole 11, and the male thread 23 of the fitting portion 18 may be mated with the female thread 42A afterward.

To remove the PCV valve 10 from the coupling hole 11, the operator rotates the PCV valve 10 until the fitting portion 18 does not apply force to the pressed portions 43. This returns the grommet 40 returns to the state shown in FIG. 2 in which the lower portion is not expanded, Next, the PCV valve 10, the male thread 23 of which is halfway mated with the female thread 42A, is pulled out of the coupling hole 11 together with the grommet 40. Alternatively, the male thread 23 may be fully disengaged from the female screw hole 42. In this state, the PCV valve 10 is removed from the coupling hole 11 with the grommet 40 remaining in the coupling hole 11.

The following advantage is obtained in the coupling structure 200 of the PCV valve of the second embodiment in addition to the advantages of the first embodiment.

The four pressed portions 43 are equally spaced in the opening of the grommet 40, and the distal end of the fitting portion 18 applies force to the pressed portion 43 to expand the grommet 40. Accordingly, the entire circumference in the opening of the grommet 40 does not have to be enlarged. This enables the grommet 40 to be made of synthetic rubber or synthetic resin that is harder and has a longer durability.

It should be apparent to those skilled in the art that the present invention may be embodied in many other specific forms without departing from the spirit or scope of the invention. Particularly, it should be understood that the present invention may be embodied in the following forms.

The male thread 23 may be formed only on the basal end of the fitting portion 18 and the female threads 32A, 42A may be formed only in part of the grommet flanges 29, 41. This facilitates the attachment of the grommet 12 to the PCV valve 10. Further, this results in forcible removal of the tubing hose T when the PCV valve 10 is coupled and removed.

The male thread 23 of the fitting portion 18 and the female thread 32A of the grommet 12 do not have to be formed. In this case, the fitting portion 18 is fitted halfway in the grommet 12, to engage the grommet 12 with the fitting portion 18. Then, the grommet 12 is fully fitted in the coupling hole 11 to expand the grommet 12. The coupling hole 11 does not necessarily have to be circular and may be, for example, elliptic or square. If the coupling hole 11 is square, the four corners may be curved.

The pressed portions 33, 43 need not be formed in the female screw holes 32, 42 of the grommets 12, 40 so that the fitting portion 18 does not expand the grommets 12, 40.

The tabs 21 may be replaced by, for example, a hexagonal nut.

The main body 13 and the valve body 14 of the PCV valve 10 may be formed from metal or ceramic.

The PCV valve may be coupled with to a coupling hole formed in a crank case.

Therefore, the present examples and embodiments are to be considered as illustrative and not restrictive, and the invention is not to be limited to the details given herein, but may be modified within the scope and equivalence of the appended claims.

What is claimed is:

1. A coupling structure for a flow control valve, the coupling structure comprising:
   a fitting portion having a male thread that is formed on a peripheral surface of the flow control valve;
   a coupled member having a coupling hole to receive the flow control valve; and
   a cylindrical elastic sealing member engaged with the coupling hole to seal the space between the flow control valve and the coupling hole, wherein the elastic sealing member has an inner surface defining a mounting hole in which the fitting portion is fitted, a female thread formed on the inner surface, the female thread being mated with the male thread of the fitting portion, and a pressed portion formed on the inner surface defining the mounting hole, and
   wherein the pressed portion is pressed by the fitting portion to radially expand the elastic sealing member when the fitting portion is fitted in the mounting hole, and wherein the coupled member includes a front surface and a rear surface, the elastic sealing member being engaged with the coupled member from the front surface, and the coupled member includes a stopper socket, which is formed adjacent to the coupling hole in the front surface without extending through the coupled member, and wherein the elastic sealing member includes a stopper, which projects from the elastic sealing member, the stopper being received in the stopper socket.

2. The coupling structure according to claim 1, wherein the flow control valve has a main body formed from synthetic resin, and the main body has a rotating portion for rotating the male thread and mating the male thread with the female thread.

3. The coupling structure according to claim 2, wherein the flow control valve is a blowby gas returning apparatus flow control valve incorporated in an internal combustion engine.

4. The coupling structure according to claim 3, wherein the main body has a hose connector for connecting a hose, and the rotating portion is arranged in the hose connector.

5. The coupling structure according to claim 1, wherein the flow control valve has a main body formed from synthetic resin, and the main body has a rotating portion for rotating the male thread and mating the male thread with the female thread.

6. The coupling structure according to claim 1, wherein the flow control valve is a blowby gas returning apparatus flow control valve incorporated in an internal combustion engine.

7. A cylindrical elastic sealing member formed from a rubber material, wherein the elastic sealing member receives a fitting body and seals between the fitting body and a coupled member, the elastic sealing member comprising:

a mounting hole for receiving the fitting body;

a pressed portion formed on a inner surface defining the mounting hole and pressed by the fitting body, the pressed portion including an outer surface, wherein the outer surface includes an annular groove for receiving a portion of the coupled member; and a stopper formed in the annular groove for preventing the elastic sealing member from rotating when the mounting hole receives the fitting body, wherein the pressed portion radially expands the elastic sealing member when pressed by the fitting body.

8. The cylindrical elastic sealing member according to claim 7, wherein the outer surface of the pressed portion includes a tapered surface.

* * * * *